US007634519B2

(12) United States Patent
Creamer et al.

(10) Patent No.: US 7,634,519 B2
(45) Date of Patent: Dec. 15, 2009

(54) BYPASSING AN INTERMEDIATE SYNCHRONIZATION SERVER OF A THREE TIERED SYNCHRONIZATION SYSTEM

(75) Inventors: Thomas E. Creamer, Boca Raton, FL (US); Curtis E. Hrischuk, Holly Springs, NC (US); William C. Wimer, II, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 11/015,113

(22) Filed: Dec. 17, 2004

(65) Prior Publication Data

US 2006/0136517 A1 Jun. 22, 2006

(51) Int. Cl.
*G06F 17/30* (2006.01)
(52) U.S. Cl. .............. 707/204; 707/8; 707/9; 707/10; 707/200; 707/201; 707/203; 709/218; 709/228
(58) Field of Classification Search ............. 707/201, 707/100, 204, 8, 9, 10, 200, 203; 709/218, 709/228
See application file for complete search history.

(56) References Cited

U.S. PATENT DOCUMENTS

| | | | |
|---|---|---|---|
| 4,714,995 A * | 12/1987 | Materna et al. ............. 707/201 |
| 5,862,346 A * | 1/1999 | Kley et al. ................. 709/245 |
| 5,950,198 A * | 9/1999 | Falls et al. ..................... 707/8 |
| 6,044,381 A * | 3/2000 | Boothby et al. ............. 707/201 |
| 6,175,930 B1 | 1/2001 | Arimilli et al. |
| 6,247,135 B1 * | 6/2001 | Feague ........................ 713/400 |
| 6,330,568 B1 | 12/2001 | Boothby et al. |
| 6,411,966 B1 * | 6/2002 | Kwan et al. ................. 707/201 |
| 6,516,314 B1 | 2/2003 | Birkler et al. |
| 6,643,669 B1 | 11/2003 | Novak et al. |
| 6,745,209 B2 * | 6/2004 | Holenstein et al. .......... 707/203 |
| 2003/0087219 A1 * | 5/2003 | Berger et al. ................ 434/118 |
| 2003/0110172 A1 * | 6/2003 | Selman et al. ................ 707/10 |
| 2004/0044702 A1 * | 3/2004 | Ferreira Alves et al. ..... 707/203 |
| 2004/0225693 A1 * | 11/2004 | Ganji et al. .................. 707/201 |
| 2005/0060435 A1 * | 3/2005 | Xue et al. .................... 709/248 |

FOREIGN PATENT DOCUMENTS

WO    WO 03/044698    5/2003

* cited by examiner

*Primary Examiner*—Khanh B Pham
*Assistant Examiner*—Syling Yen
(74) *Attorney, Agent, or Firm*—Novack Druce + Quigg LLP

(57) ABSTRACT

A bypasser configured to operate within a three tiered synchronization system. The bypasser can include an interceptor and an inference engine. The interceptor can intercept synchronization requests before a synchronization event involving a synchronization server is initiated. The inference engine can determine if the data store and the another data store are to be synchronized and can selectively initiate the synchronization event based on the determination of the inference engine. For example, when the inference engine determines that synchronization is not to occur, the bypasser can convey a notification that no update is needed to the source of an intercepted synchronization request without requiring the synchronization server to process the synchronization request. When the inference engine determines that synchronization is to occur, the bypasser can convey an intercepted synchronization request to the intermediate synchronization server for processing.

10 Claims, 1 Drawing Sheet

BYPASSING AN INTERMEDIATE SYNCHRONIZATION SERVER OF A THREE TIERED SYNCHRONIZATION SYSTEM

BACKGROUND

1. Field of the Invention

The present invention relates to the data store synchronization and, more particularly, to a technique for situationally bypassing a synchronization server of a three tiered synchronization system.

2. Description of the Related Art

Handheld devices are commonly synchronized with a remotely located computer so that email, contact information, calendar events, tasks, and the like are consistent between the handheld device and the computer. Conventionally, a three tiered approach is taken to synchronize the data on the handheld device. In the three tiered approach, a synchronization client residing on the handheld device connects to an intermediate server called a synchronization server, which in turn connects to a personal information management (PIM) server or other data server that resides on the remotely located computer.

More specifically, synchronization operations are typically controlled by the synchronization client that uses a well defined communication protocol, such as SyncML, to convey a synchronization request to the synchronization server. The synchronization server connects to the PIM server to query whether the PIM server includes data more current than the data which resides in the synchronization client. When data needs to be updated, the data is retrieved by the synchronization server from the PIM server and conveyed to the synchronization client. When data does not need to be updated, the synchronization server conveys a notification to the synchronization client indicating that the client contains current information. Similarly, the synchronization server can query the synchronization client for updated information and can convey any updated data found from the synchronization client to the PIM server as appropriate.

Under the conventional three tiered synchronization methodology, however, it is common for a synchronization client to submit a synchronization request when there is no information on the PIM server that needs to be conveyed to the synchronization client and when there is no information on the synchronization client that needs to be conveyed to the PIM server. A synchronization attempt that results in no data being conveyed between the synchronization client and the PIM server can be referred to as an "empty update".

Empty updates can be problematic as a significant amount of processing occurs within the synchronization server (which establishes a connection with both the PIM server and the synchronization client and queries both data stores) for synchronization attempts that result in empty updates. There can also be a substantial delay for users of the handheld devices (typically fifteen to thirty seconds) before the users are informed that no information needs to be updated.

The delay and processing overhead can be increasingly troublesome when multiple users attempt to update their own handheld devices via the synchronization server at approximately the same time, such as when arriving at work in the morning, as a substantial processing bottleneck can occur at the synchronization server. What is needed is a method to detect empty updates and to bypass going to the synchronization server so that user delays can be reduced, synchronization server resources can be conserved, and PIM server resources can be conserved.

SUMMARY OF THE INVENTION

One aspect of the present invention can include a bypasser configured to operate within a three tiered synchronization system. The three tiered synchronization system can include a client with a data store, an intermediate synchronization server, and a data server with another data store that is intermittently synchronized with the clients' data store using the intermediate synchronization server. The synchronization operations performed by the three tiered synchronization system can include bidirectional operations such that synchronization occurs between the client's data store and the server's data store as well as between the server's data store and the client's data store.

The bypasser can include an interceptor and an inference engine. The interceptor can intercept synchronization requests before a synchronization event involving the synchronization server is initiated. The inference engine can determine if the data store and the another data store are to be synchronized and can selectively initiate the synchronization event based on the determination of the inference engine.

For example, when the inference engine determines that synchronization is not to occur, the bypasser can convey a notification that no update is needed to the source of an intercepted synchronization request without requiring the synchronization server to process the synchronization request. When the inference engine determines that synchronization is to occur, the bypasser can convey an intercepted synchronization request to the intermediate synchronization server for processing.

Another aspect of the present invention can include a computerized method for handling empty update events within a three tiered synchronization system having a client, synchronization server, and data server. The method can include the step of detecting a synchronization request for synchronizing a data store of the client with a data store of the data server. Before the synchronization request is conveyed to the synchronization server, a determination based upon a previously established indicator can be made to determine whether a data update is necessary. A synchronization event can be selectively initiated based upon results of the previous determination.

It should be noted that the invention can be implemented as a program for a controlling computer to implement the functions described herein, or as a program for enabling a computer to perform the process corresponding to the steps disclosed herein. This program may be provided by storing the program in a magnetic disk, an optical disk, a semiconductor memory, any other recording medium, or distributed via a network.

BRIEF DESCRIPTION OF THE DRAWINGS

There are shown in the drawings, embodiments which are presently preferred, it being understood, however, that the invention is not limited to the precise arrangements and instrumentalities shown herein.

DETAILED DESCRIPTION OF THE INVENTION

Figure 1:
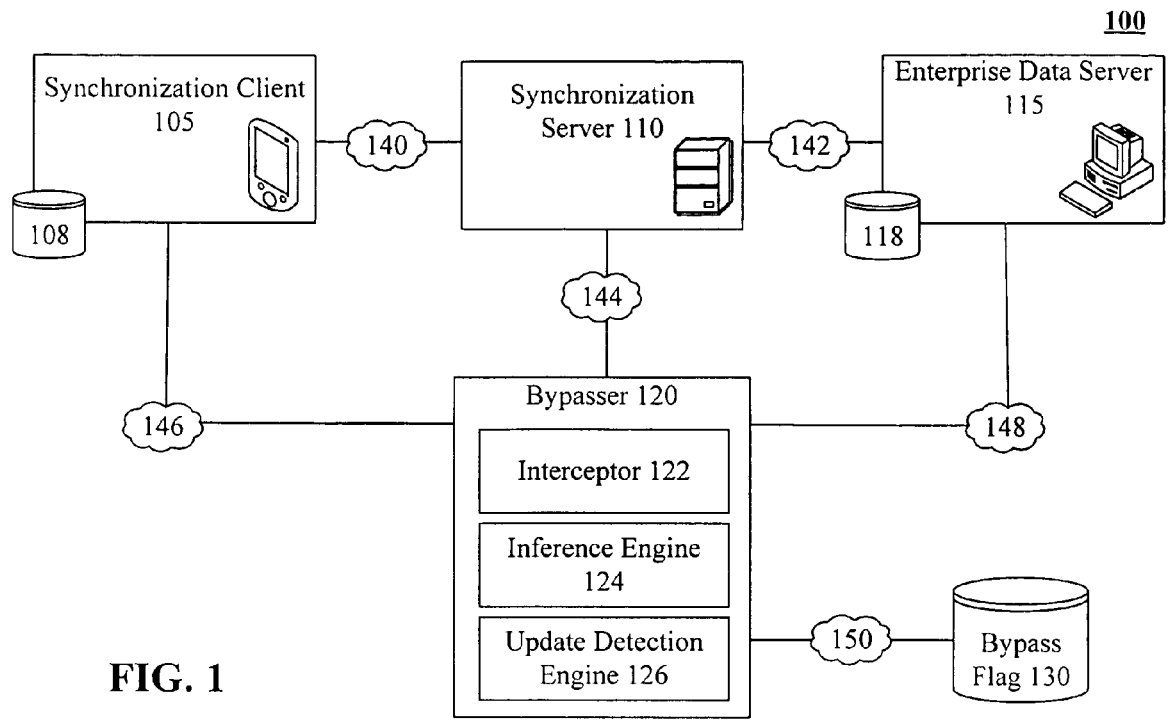
FIG. 1 is a schematic diagram illustrating a three tiered synchronization system in accordance with an embodiment of the inventive arrangements disclosed herein.

FIG. 1 is a schematic diagram illustrating a three tiered synchronization system 100 in accordance with an embodiment of the inventive arrangements disclosed herein. System 100 can include a synchronization client 105, a synchronization server 110, an enterprise data server 115, and a bypasser 120.

The synchronization client 105 can be a client application on a computer device having an associated data store 108. The data store 108 can be intermittently synchronized with a data store 118 of the enterprise data server 115. Accordingly, the synchronization client 105 can represent a front-end component that is linked to a back end component (enterprise data server 115). While the synchronization client 105 can be any type of application residing on any platform or computing device, the synchronization client 105 is often a component of a contact management application residing on a handheld device, such as a personal data assistant (PDA), a mobile telephone, a portable media player, a computer tablet, and the like. For example, the synchronization client 105 can include PALM PIM applications for contacts, calendars, and tasks.

The enterprise data server 115 can include a server application on a computing device having an associated data store 118. The enterprise data server 115 can include a standalone application, like a Desktop PIM application, and can also include a backend system that provides data services for a networked management, information system. For example, the enterprise data server 115 can include a LOTUS DOMINO server from International Business Machine Corporation (IBM) of Armonk, N.Y., a NOVELL GROUPWISE server from Novell Inc. of Waltham, Mass., and the like.

The enterprise data server 115 can be configured in accordance with a number of different synchronization technologies that permit the data in data store 108 to synchronize with data in data store 118 in a bidirectional fashion. For example, in different embodiments of the present invention, the enterprise data server 115 can include a PIM server, a relational database server, a form server, and other types of bi-directional data servers.

As used herein, a PIM server is a server designed to provide contact information such as calendar entries, tasks, address information, and the like to one or more synchronization clients 105. Commonly, a PIM server can be located upon a desktop machine and the synchronization clients 105 can be located within one or more mobile devices. It is also common for the PINM server to be an enterprise server that serves PIM information to a plurality of desktop machines and mobile client devices. In certain embodiment, the PIM server (or other type of enterprise data server 115) can be implemented as multiple cloned servers to reduce processing bottlenecks and/or to provide a level of redundancy so that if a primary server fails, server operations can be performed by a backup server.

The PIM server (or other type of enterprise data server 115) can be configured to automatically synchronize itself with one or more synchronization clients 105 in accordance with client-specific settings. Each of the client-specific settings can specify a synchronization level, a synchronization frequency, and other client-specific integration parameters.

For example, the PIM server can be configured to synchronize scheduling data, calendaring information, and contact information including street addresses on a daily basis between an internal data store and a corresponding data store of a PDA. The same PIM server can be configured to synchronize contact information including email addresses and phone numbers on a weekly basis between an internal data store and a corresponding data store of a mobile telephone, which is a different synchronization client 105 from the PDA that is utilized by the same user and is synchronized to a data store of the same PIM server.

Technology used by a relational database server is similar to that used by a PIM server in that changes are allowed to be independently made within a data store 118 associated with the relational database server or within a data store 108 associated with the synchronization client 105. From time to time, the client 105 can be communicatively linked to the relational database server and information can be reconciled or updated in a bidirectional manner. The information stored in the synchronized data stores can include any type of information and is not limited to contact information typical of a PIM server.

As used herein, the form server can be a server associated with Web-based forms. The form server can permit users to fill out forms while online as well as provide off-line forms which can be filled out at user convenience when the user is not directly connected to the form server. When the enterprise data server 105 is a form server, the synchronization server 110 can adapt information contained within off-line forms to information required for forms of the form server.

Notably, a data store 108 associated with a completed offline form can contain different information in a slightly different format than that contained in data store 118 corresponding to an online form associated with the form server. For example, an administrator can alter the format of a form within a form server causing it to be somewhat different than a corresponding completed offline form, which has been previously provided to a user and which does not include the administrator made changes. In another example, one or more generic offline forms can be used to automatically fill-in commonly requested fields within specific forms of the form server. That is, offline forms can include commonly requested user information like name, email address, and telephone number that is automatically provided to a form server when requested so as to save a user time.

The synchronization server 110 can include middleware within the three tiered system 100 that coordinates synchronization operations between the synchronization client 105 and the enterprise data server 115. The synchronization server 110 can include an enterprise server like a DOMINO EVERYPLACE server from IBM or SUREWAVE ENTERPRISE server from JP Mobile Incorporated of Dallas, Tex. The synchronization server 110 can also include a small office or desktop server that uses such applications as EASYSYNC from IBM, INTELLISYNC from Intellisync Corporation of San Jose, Calif., and HOTSYNC from Palm One Incorporated of Milpitas, Calif.

The synchronization server 110 can be configured for automatic or manual synchronization operations that are initiated by either the synchronization client 105 or the enterprise data server 115. Additionally, the synchronization server 110 can synchronize multiple synchronization clients 105 to multiple enterprise data servers 115. For example, the synchronization server 110 can synchronize a portion of data store 108 with data within data store 118 and a different portion of data store 108 with a data store (not shown) associated with a different data server (not shown). Moreover, the synchronization server 110 can synchronize the synchronization client 105 with multiple data servers simultaneously in a user transparent fashion.

Additionally, the synchronization server 110 can be implemented as a centralized computing device or as a group of distributed communicatively linked computing devices. The synchronization server 110 can also include land based communication ports and one or more wireless transceivers that function as access points (APs) for wireless communications. For example, the synchronization server 110 can include one or more strategically placed access points (APs) in accordance with established protocols, such as the extended service set (ESS) protocol.

It should be appreciated that while system 100 can utilize any suitable standard when synchronizing data between the synchronization client 105 and the enterprise data server 115, open and portable standards, such as SyncML, can be advantageously utilized in certain arrangements of the present invention to promote consistent synchronization of remote data across several networks, platforms, and devices.

The bypasser 120 can be a middleware or intermediate agent configured to intercept synchronization requests sent to the synchronization server 110 providing a direct synchronization request whenever an information update is unnecessary. Update information is unnecessary when the synchronization request would result in an empty update. The bypasser 120 can intercept a synchronization request from the synchronization client 105, can determine whether a data update is necessary, and can responsively initiate an action based upon the determination.

In embodiments where the synchronize server 110 is implemented as a pool or group of communicatively linked servers, the bypasser 120 can similarly be implemented as a pool of communicatively linked servers. Such implementations can be used to distribute the functionality of the synchronization server 110 and/or the bypasser 120 to spread processing load and/or to employ redundant components for problem recovery purposes.

The bypasser 120 can include an interceptor 122, an inference engine 124, and an update detection engine 126. The interceptor 122 can intercept synchronization requests before a synchronization event involving the synchronization server 110 is initiated. A synchronization event can include querying the data store 108 or data store 118 to determine if an update action is necessary. Additionally, a synchronization event can include updating data within data stores 108 and/or 118.

The inference engine 124 can determine if the data store 108 and 118 are synchronized with one another, thereby determining whether an update of either data store 108 or 118 is necessary. When the inference engine 124 determines that synchronization is not to occur, the bypasser 120 can convey a notification that no update is needed to the source of the intercepted synchronization request. When the inference engine 124 determines that synchronization is to occur, the bypasser 120 can convey the intercepted synchronization request to the synchronization server 110 for processing. In one embodiment, the inference engine 124 can base its determinations upon one or more previously established indicators or bypass flags stored within the bypass flag data store 130.

The update detection engine 126 can set flags or indicators within the bypass flag data store 130 that are used by the inference engine 124. The update detection engine 126 can asynchronously poll the synchronization server 110, the enterprise data server 115, or a combination of the two in an intermittent or repetitive fashion to determine if data store 118 has been updated. In one embodiment, the update detection engine 126 can also poll the synchronization client 105 to determine if data store 108 has been updated. Bypass flags can be associated with a particular data store, with a relationship between two different data stores, or with a relationship between data stores and prior synchronization operations. For example, a bypass flag can indicate whether data store 118 has been updated since the last synchronization operation was performed between data store 108 and data store 118.

It should be noted that networks 140, 142, 144, 146, 148, and 150 can be implemented in any of a variety of fashions so long as content is conveyed using encoded electromagnetic signals. Further, any of a variety of communication devices, such as customer premise equipment (CPE), computers, modems, routers, switches, access points, or the like, can be included within networks 140, 142, 144, 146, 148, and 150.

Each of the networks 140, 142, 144, 146, 148, and 150 can convey content in a packet-based or circuit-based manner. Additionally, each of the networks 140, 142, 144, 146, 148, and 150 can convey content via landlines or wireless data communication methods. For example, each of the networks 140, 142, 144, 146, 148, and 150 can separately include an Intranet, a local area network, a wide area network, or a combination thereof. In another example, each of the networks 140, 142, 144, 146, 148, and 150 can include a telephony network, like a mobile wireless network or a public switched telephone network (PSTN).

The data stores 108, 118, and 130 can store information in any recording medium, such as a magnetic disk, an optical disk, a semiconductor memory, or the like. Further, each of the data stores 108, 118, and 130 can utilize any information retention technique including a file-based storage technique or a database storage technique. Moreover, each of the data stores 108, 118, and 130 can be a storage area fixed to a geographical location or a storage area distributed across a network space.

It should be appreciated that the arrangements shown in FIG. 1 are for illustrative purposes only and that the invention is not limited in this regard. The functionality attributable to the various components can be combined or separated in different manners than those illustrated herein. For instance, the bypasser 120 can be implemented as an integrated component of the synchronization server 110 in one embodiment of the present invention. In another embodiment of the present invention, the inference engine 124 and the update detection engine 126 can be integrated as a single software component.

Figure 2:
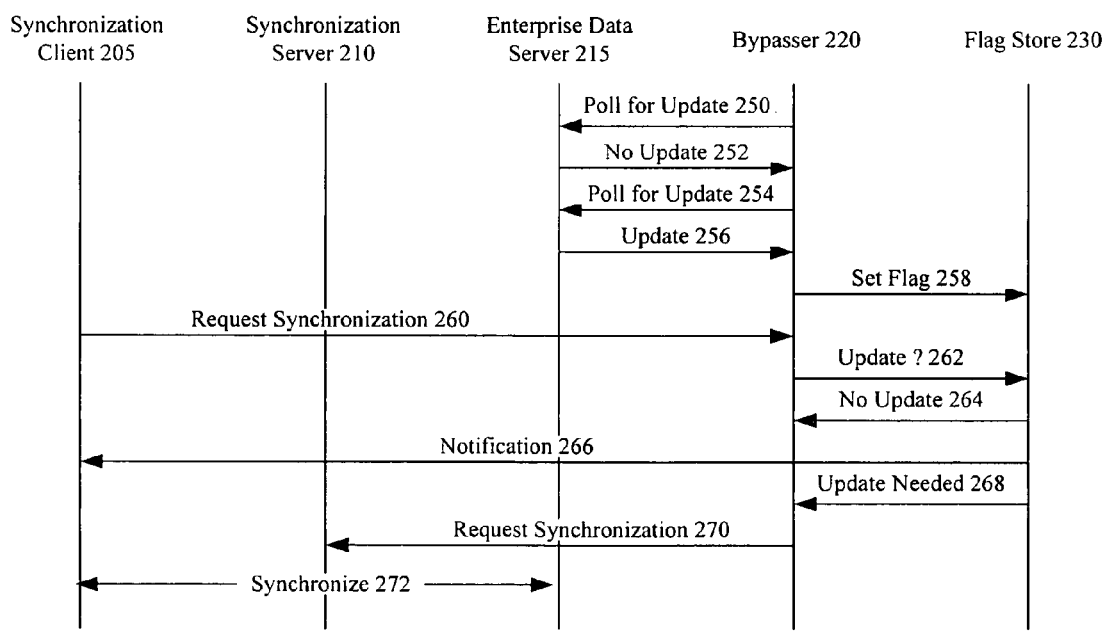
FIG. 2 is a process flow diagram illustrating a flow of information in the performance of a synchronization of data stores in accordance with an embodiment of the inventive arrangements disclosed herein.

FIG. 2 is a process flow diagram illustrating a flow of information in the performance of a synchronization of data stores in accordance with an embodiment of the inventive arrangements disclosed herein. The flow of information can include a synchronization client 205, a synchronization server 210, an enterprise data server 215, a bypasser 220, and a flag store 230. The synchronization can be performed in the context of any three tiered synchronization system, such as the system 100 of FIG. 1. Accordingly, the synchronization client 205 can be configured similar to synchronization client 105; synchronization server 210 can be configured similar to synchronization server 110, Enterprise data server 215 can be configured similar to enterprise data server 115, bypasser 220 can be configured similar to bypasser 120, and flag store 230 can be configured similar to bypass flag 130.

Bypasser 220 can set flags within flag store 230 by polling the enterprise data server 215, synchronization server 210, synchronization client 205, or combinations thereof intermittently as processing resources permit. For example, process flows 250-258 illustrate an operation where the bypasser 220 polls the enterprise data server 215 to set flags in flag store 230. Additionally, bypasser 220 can intercept synchronization requests and determine based on the flags in the flag store 230 whether updates are appropriate as shown by process flows 260-272. Process flows 250-258 can iteratively occur in an asynchronous fashion to process flows 260-272.

To illustrate the setting of the flags in the flag store 230, in flow 250, the bypasser 220 can poll the enterprise data server 215 for updates. In flow 252, when no updates are indicated responsive to the polling, the bypasser 220 can permit an associated flag in the flag store 230 to remain in a default state, which would indicate that no update has occurred. So long as this default remains, periodic polling by the bypasser 220 can occur, as shown in flow 254, when another polling occurs. When the polling indicates an update, as shown in flow 256, an update indication can be conveyed from the enterprise data server 215 to the bypasser 220. The bypasser 220 can set an update flag, as shown by flow 258, within the flag store 230. Once an update flag has been set, the bypasser 220 need not continue to poll the enterprise data server 215 for further updates in regard to the synchronization data stores for which the established flag is associated.

To illustrate the utilizing of the flags in the flag store 230, in flow 260, the synchronization client 205 can convey a synchronization request to the bypasser 220. The bypasser 220 can, in flow 262, query the flag store 230 to determine whether a synchronization operation is appropriate. When no update is appropriate, as indicated in flow 264, an indication to this effect can be conveyed to the bypasser 220. Consequently, in flow 266, the bypasser 220 can convey a notification that no update is needed to the synchronization client 205.

When the flag of in the flag store 230 indicates that an update is needed, as shown by flow 268, an update needed indication can be conveyed from the flag store 230 to the bypasser 220. In flow 270, the bypasser 220 can responsively convey the synchronization request to the synchronization server 210. Responsive to receiving the synchronization request, the synchronization server 210 can perform a synchronization operation, as illustrated by flow 272, thereby synchronizing the synchronization client 205 and the enterprise data server 215.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A computer-implemented method for preventing empty update events within a three tiered synchronization system having a client, a synchronization server, and a data server, said method comprising the steps of:
    periodically polling the client, the synchronization server, and the data server until an update in at least one among a data store of the client and a data store of the data server is detected;
    wherein the client, the synchronization server, and the data server each resides on an independent entity separately;
    establishing an indicator, wherein a default state is set when no update is detected and an update flag is set upon detecting the update;
    intercepting a synchronization request by an interceptor from one of the client and the data server for synchronizing with the other one of the client and the data server;
    determining whether or not a data update is necessary based upon the established indicator before the synchronization request is conveyed from the interceptor to the synchronization server;
    conveying the synchronization request to the synchronization server if it is determined that a data update is necessary; and
    conveying a notification that no data update is needed to the client or the data server from which the synchronization request was intercepted, without conveying the synchronization request to the synchronization server, if it is determined that a data update is not necessary;
    wherein synchronization operations are bidirectional operations such that synchronization occurs between the client's data store and the server's data store as well as between the server's data store and the client's data store;
    wherein the notification is sent to either the client or the data server depending on the database in which an update has been detected.

2. The method of claim 1, wherein the determining step indicates that a data update is not necessary when the flags indicate that an empty update event would result from the synchronization request.

3. The method of claim 1, wherein the synchronization server initiates a synchronization action between the client and the data server upon receiving the synchronization request.

4. The method of claim 1, further comprising the steps of:
    detecting a synchronization request for synchronizing the data store of the client with a data store of a second data server;
    before the synchronization request associated with the second data server is conveyed to a synchronization server associated with the second data server, determining based upon a previously established indicator whether a data update is necessary; and
    selectively initiating a synchronization event based upon results of the determining step such that the synchronization request associated with the second data server is conveyed to the synchronization server associated with the second data server only when the indicator indicates that a non-empty update event would result.

5. The method of claim 1, wherein the client resides within a handheld device and wherein the data server is a personal information management (PIM) data server.

6. The method of claim 1, wherein the client resides within a handheld device and wherein the data server is a form server.

7. The method of claim 1, wherein the client resides within a handheld device and wherein the data server is a relational database server.

8. The method of claim 1, wherein the synchronization of data between the client and the data server utilizes the SynchML protocol.

9. A machine-readable storage for handling empty update events within a three tiered synchronization system having a client, synchronization server, and data server, the machine-readable storage having stored thereon, a computer program having a plurality of code sections, said code sections executable by a machine for causing the machine to perform the steps of:
- periodically polling the client, the synchronization server, and the data server until an update in at least one among a data store of the client and a data store of the data server is detected;
- wherein the client, the synchronization server, and the data server each resides on an independent entity separately;
- establishing an indicator, wherein a default state is set when no update is detected and an update flag is set upon detecting the update;
- intercepting a synchronization request by an interceptor from one of the client and the data server for synchronizing with the other one of the client and the data server;
- determining whether or not a data update is necessary based upon the established indicator before the synchronization request is conveyed from the interceptor to the synchronization server;
- conveying the synchronization request to the synchronization server if it is determined that a data update is necessary; and
- conveying a notification that no data update is needed to the client or the data server from which the synchronization request was intercepted, without conveying the synchronization request to the synchronization server, if it is determined that a data update is not necessary;
- wherein synchronization operations are bidirectional operations such that synchronization occurs between the client's data store and the server's data store as well as between the server's data store and the client's data store;
- wherein the notification is sent to either the client or the data server depending on in which database an update has been detected.

10. A computer-implemented system for preventing empty update events within a three tiered synchronization system having a client, a synchronization server, and a data server, said method comprising the steps of:
- at least one processor;
- at least one memory;
- means for periodically polling the client, the synchronization server, and the data server until an update in at least one among a data store of the client and a data store of the data server is detected;
- wherein the client, the synchronization server, and the data server each resides on an independent entity separately;
- means for establishing an indicator, wherein a default state is set when no update is detected and an update flag is set upon detecting the update;
- an interceptor for intercepting a synchronization request by an interceptor from one of the client and the data server for synchronizing with the other one of the client and the data server;
- means for determining whether or not a data update is necessary based upon the established indicator before the synchronization request is conveyed from the interceptor to the synchronization server;
- means for conveying the synchronization request to the synchronization server if it is determined that a data update is necessary; and
- means for conveying a notification that no data update is needed to the client or the data server from which the synchronization request was intercepted, without conveying the synchronization request to the synchronization server, if it is determined that a data update is not necessary;
- wherein synchronization operations are bidirectional operations such that synchronization occurs between the client's data store and the server's data store as well as between the server's data store and the client's data store;
- wherein the notification is sent to either the client or the data server depending on in which database an update has been detected.

* * * * *